US009665941B2

(12) United States Patent
Tang et al.

(10) Patent No.: US 9,665,941 B2
(45) Date of Patent: May 30, 2017

(54) OBJECT SEGMENTATION

(71) Applicant: HEWLETT-PACKARD DEVELOPMENT COMPANY, L.P., Houston, TX (US)

(72) Inventors: Feng Tang, Palo Alto, CA (US); Qian Lin, Sunnyvale, CA (US); Daniel R Tretter, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/439,293

(22) PCT Filed: Oct. 30, 2012

(86) PCT No.: PCT/US2012/062597
§ 371 (c)(1),
(2) Date: Apr. 29, 2015

(87) PCT Pub. No.: WO2014/070145
PCT Pub. Date: May 8, 2014

(65) Prior Publication Data
US 2015/0294476 A1    Oct. 15, 2015

(51) Int. Cl.
*G06K 9/00* (2006.01)
*G06T 7/00* (2017.01)
*G06T 7/11* (2017.01)
*G06T 7/187* (2017.01)
*G06T 7/194* (2017.01)

(52) U.S. Cl.
CPC ............. *G06T 7/0081* (2013.01); *G06T 7/11* (2017.01); *G06T 7/187* (2017.01); *G06T 7/194* (2017.01);
(Continued)

(58) Field of Classification Search
CPC ......... G06T 7/0081; G06T 2207/20081; G06T 2207/20076; G06T 2207/20104;
(Continued)

(56) References Cited

U.S. PATENT DOCUMENTS

2003/0179214 A1*   9/2003   Saund .................... G06T 11/60
                                                                        345/619
2004/0202368 A1    10/2004   Lee
(Continued)

FOREIGN PATENT DOCUMENTS

CN          102360494         2/2012
KR    10-2012-0053211 A    5/2012

OTHER PUBLICATIONS

Sommer, Christoph, et al. "ilastik: Interactive learning and segmentation toolkit." Biomedical Imaging: From Nano to Macro, 2011 IEEE International Symposium on. IEEE, 2011.*
(Continued)

*Primary Examiner* — Li Liu
(74) *Attorney, Agent, or Firm* — Mannava & Kang, P.C.

(57) ABSTRACT

According to an example, a method for object segmentation may include receiving a digital image, performing initial segmentation on the digital image to generate a segmented digital image, and receiving refinement instructions to refine the initial segmentation. The method may further include inferring an intention of a user to correct a foreground area or a background area of the initial segmentation based on the received refinement instructions, learning a behavior of the user to further infer the intention of the user to correct the foreground area or the background area, and refining, by a processor, the initial segmentation based on the inferred intention.

15 Claims, 10 Drawing Sheets

(52) U.S. Cl.
CPC ............... *G06T 2207/20076* (2013.01); *G06T 2207/20081* (2013.01); *G06T 2207/20104* (2013.01); *G06T 2207/30196* (2013.01)

(58) Field of Classification Search
CPC . G06T 2207/30196; G06T 7/11; G06T 7/143; G06T 2200/24; G06T 2207/20092; G06T 7/187; G06T 7/194
See application file for complete search history.

(56) References Cited

U.S. PATENT DOCUMENTS

| | | | |
|---|---|---|---|
| 2007/0211940 A1* | 9/2007 | Fluck | ................ G06K 9/38 382/173 |
| 2008/0071711 A1 | 3/2008 | Zhang et al. | |
| 2008/0097942 A1 | 4/2008 | Zhao et al. | |
| 2008/0136820 A1 | 6/2008 | Yang et al. | |
| 2008/0201734 A1* | 8/2008 | Lyon | ............. G06Q 30/0251 725/34 |
| 2009/0245575 A1 | 10/2009 | Hu | |

OTHER PUBLICATIONS

"Generalizing the Instructor Extraction", Oct. 9, 2006.
Carreira, J. et al, "Constrained Parametric Min-cuts for Automatic Object Segmentation", Jul. 2012.
Maes, F. et al, "Automatic Image Partitioning for Generic Object Segmentation in Medical Images", Jun. 26-30, 1995.

* cited by examiner

US 9,665,941 B2

OBJECT SEGMENTATION

BACKGROUND

A digital image can be partitioned into multiple segments by a process called segmentation. Typically, segmentation includes clustering of pixels into segments that are similar with respect to some characteristic or computed property, such as color, intensity, or texture. However, this type of segmentation does not provide any semantic information with respect to the contents of the digital image. For example, segmenting a digital image based on color does not provide semantic information as to whether the image has people, or other objects therein. Semantic information may be extracted from images, for example, by building models for the foreground and background areas. User interaction may be used to increase the object segmentation accuracy.

BRIEF DESCRIPTION OF DRAWINGS

Features of the present disclosure are illustrated by way of example and not limited in the following figure(s), in which like numerals indicate like elements, in which.

DETAILED DESCRIPTION

Figure 1:
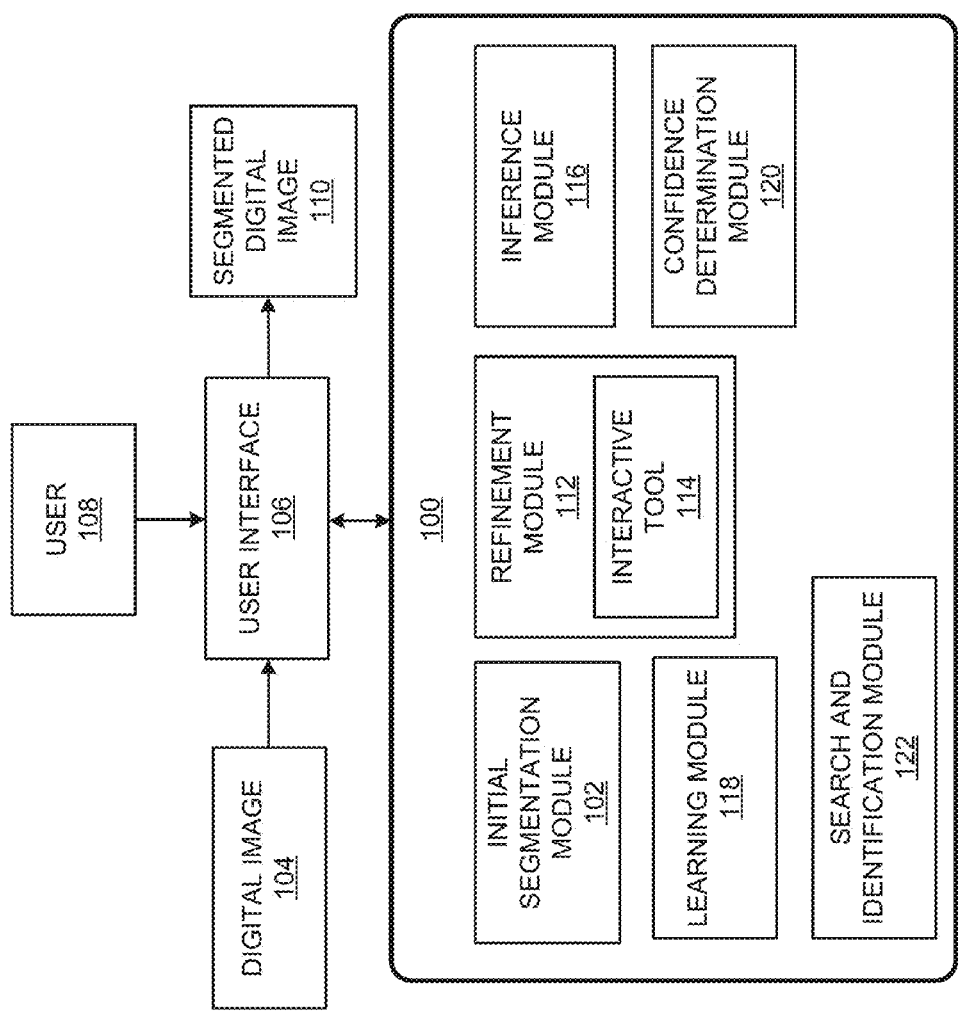
FIG. 1 illustrates an architecture of an object segmentation apparatus, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

In the process of image segmentation, semantic information can be extracted from an image, for example, by using a foreground brush to identify foreground objects and a background brush to identify background areas. Using foreground and background brushes can be inconvenient in certain scenarios, such as segmentation on mobile devices which typically have limited screens. Using foreground and background brushes can also be a relatively inefficient process for segmenting multiple images as a user has to first select a foreground brush to identify foreground objects and a background brush to identify background areas. The cumulative time it can take to select foreground and background brushes, and to further identify foreground objects or background areas can add inefficiencies into the overall image segmentation process.

An object segmentation apparatus and a method for object segmentation are described, and generally include use of a single brush type to automatically infer a user's intentions without the need to switch between foreground and background brushes. A user's intentions may be inferred, for example, based on initial automatic segmentation results, and based on the user interaction behavior learned over time. By inferring user intentions, inefficiencies related to an amount of user interaction, such as selection and switching between foreground and background brushes, are reduced.

For an example of a human object in a digital image, the object segmentation apparatus and the method for object segmentation automatically and efficiently segment human head and shoulder areas. For example, given a photo of a person, an initial segmentation of the head and shoulder areas of the person is generated and presented to a user (e.g., for approving or modifying the initial segmentation). If the user needs to refine the initial segmentation, an interactive tool (i.e., an interactive brush) is provided to the user to correct any perceived segmentation errors. Based on where the user draws a stroke on the digital image, the object segmentation apparatus and the method for object segmentation automatically infer the user's intentions based on the initial segmentation. This simplified interaction reduces the amount of time spent on image segmentation. For devices with limited screen area for such segmentation (e.g., mobile devices), the interactive tool facilitates image segmentation and refinement by eliminating the need for selection and switching between foreground and background brushes.

The object segmentation apparatus and the method for object segmentation may also be used to capture an image, automatically segment objects in the image, and provide for automatic search of objects in the captured image. The automatic segmentation may be refined as needed by a user, and the objects obtained from the image may be matched to a database of objects. The matched objects may be used to determine aspects such as type, location, price, point of sale, etc., related to the object. Thus, the object segmentation apparatus and the method for object segmentation provide for automatic search and identification of objects in a captured image.

FIG. 1 illustrates an architecture of an object segmentation apparatus 100, according to an example. Referring to FIG. 1, the apparatus 100 is depicted as including an initial segmentation module 102 to perform initial segmentation on a digital image 104. The digital image 104 may be received at a user interface 106 on a device, such as a mobile device, a tablet, or personal computer (PC). A user 108 may command the object segmentation apparatus 100 to perform the initial segmentation and to generate a segmented digital image 110. If the user wishes to modify the initial segmentation performed by the initial segmentation module 102, a refinement module 112 may use an interactive tool (i.e., an interactive brush) 114 to allow the user 108 to refine the initial segmentation. Based, for example, on strokes performed on the segmented digital image 110, an inference module 116 is to infer intentions of the user 108. For example, the inference module 116 is to infer whether to remove background pixels in the segmented digital image 110 that the user perceives as being mistakenly classified as foreground, or to add background pixels into the foreground that the user perceives as pixels on an object and further perceives as being mistakenly classified as background. Based on the inference determined by the inference module 116, the refinement module 112 is to refine the initial segmentation performed by the initial segmentation module 102, and generate a refined version of the segmented digital image 110. A learning module 118 is to interact with the inference module 116 to facilitate inference of intentions of the user 108 based, for example, on the behavior of the user 108 to learn a relationship between refinement performed by the user 108 and the refined segmented digital image 110. A confidence determination module 120 is to determine a confidence of the segmentation performed by the initial segmentation module 102 and the refinement module 112 along the segmentation. A search and identification module 122 is to automatically search and identify objects in the digital image 104.

The modules 102, 112, 116, 118, 120 and 122, and other components of the apparatus 100 that perform various other functions in the apparatus 100, may comprise machine readable instructions stored on a computer readable medium. In addition, or alternatively, the modules 102, 112, 116, 118, 120 and 122, and other components of the apparatus 100 may comprise hardware or a combination of machine readable instructions and hardware.

Figure 2:
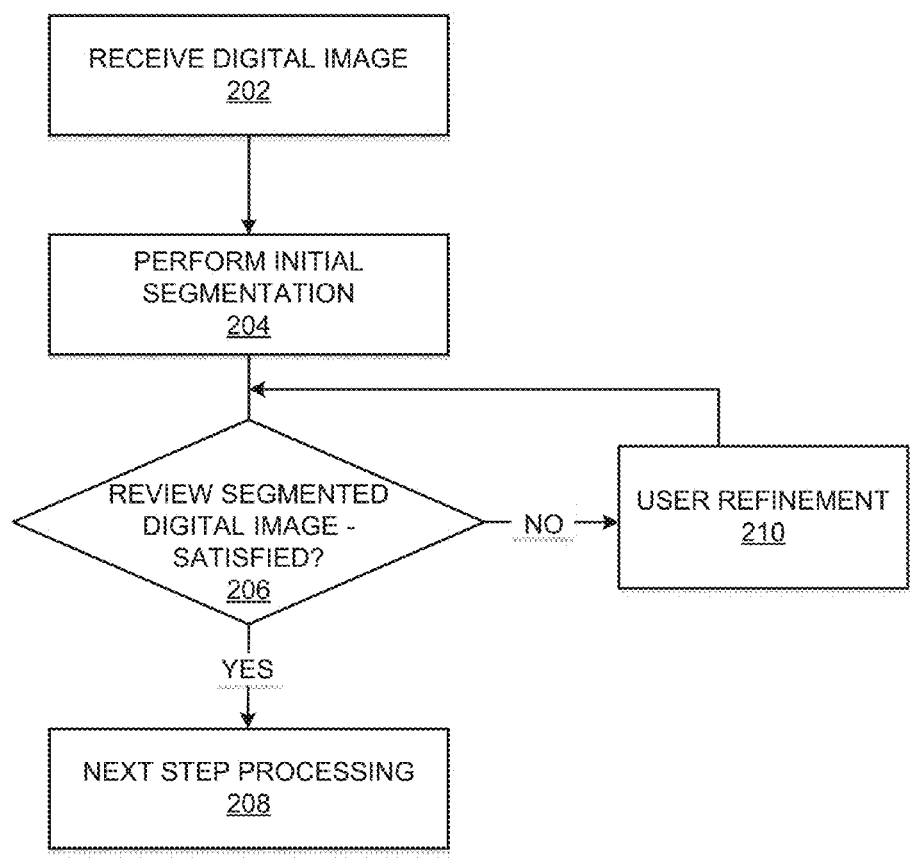
FIG. 2 illustrates a flowchart of an object segmentation process using the object segmentation apparatus, according to an example of the present disclosure.

FIG. 2 illustrates a flowchart 200 of an object segmentation process using the object segmentation apparatus 100, according to an example of the present disclosure. At 202, the digital image 104 is received at the user interface 106 on a device, such as a mobile device, tablet, PC, etc. The digital image 104 may include objects such as people, animals or other objects that are to be segmented. At 204, the initial segmentation module 102 is to perform initial segmentation on the digital image 104. At 206, the user 108 may review the segmented digital image 110. At 208, if the user 108 is satisfied with the segmented digital image 110, the segmented digital image 110 may be further processed, for example, for aesthetic enhancement of desaturating the background. However, if the user 108 is not satisfied with the segmented digital image 110, at 210 the segmented digital image 110 may be refined, for example, by the refinement module 112, the inference module 116, and the learning module 118 as described herein, to correct any perceived segmentation errors. Once the user 108 is satisfied with the refined segmented digital image 110, the refined segmented digital image 110 may be further processed at 208, for example, for aesthetic enhancement of desaturating the background.

Figure 3:
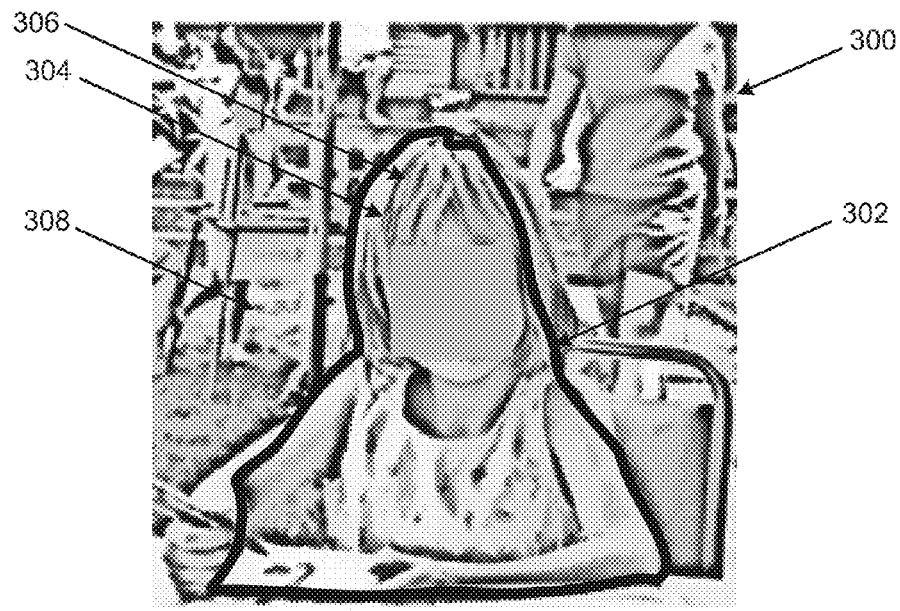
FIG. 3 illustrates automatic initial segmentation of an image using the object segmentation apparatus, according to an example of the present disclosure.

FIG. 3 illustrates automatic initial segmentation of an image 300 using the object segmentation apparatus 100, according to an example of the present disclosure. Referring to FIGS. 1 and 3, the initial segmentation module 102 performs initial segmentation at 302 on the digital image 300, for example, by combining prior information about the shape of an object 304 (e.g., a person) with appearance information to build a model to automatically segment the object 304 without any intervention from the user 108. The initial segmentation at 302 thus separates the digital image 300 into a foreground area 306 including the object 304 and background area 308. The foreground area 306 generally includes anything within the boundary defined by the initial segmentation at 302, and the background area 308 generally includes anything outside of the boundary defined by the initial segmentation at 302.

Figure 4:
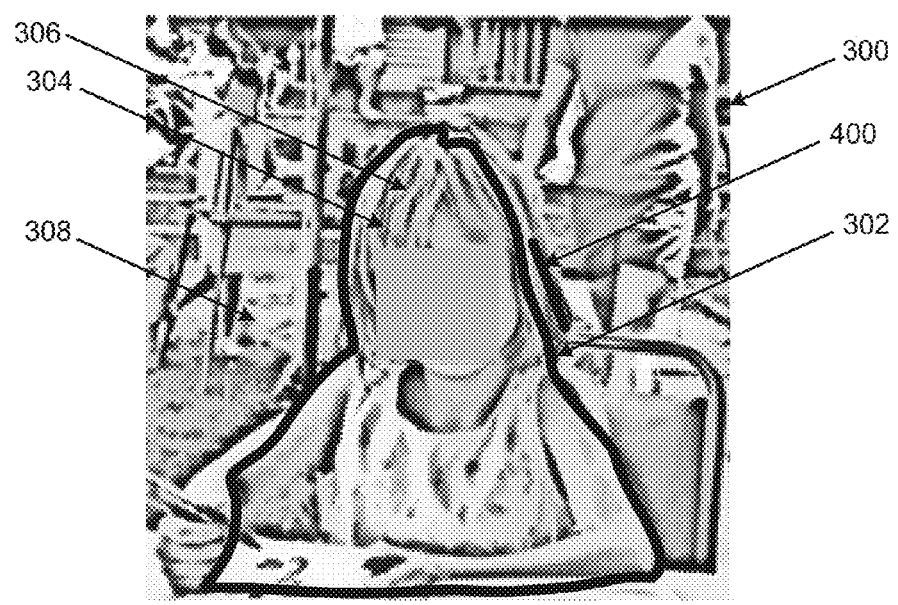
FIG. 4 illustrates an interactive refinement stroke for the automatic initial segmentation of FIG. 3 using the object segmentation apparatus, according to an example of the present disclosure.

FIG. 4 illustrates an interactive refinement stroke 400 for the automatic initial segmentation of FIG. 3 using the object segmentation apparatus 100, according to an example of the present disclosure. Referring to FIGS. 1 and 4, as discussed above with reference to FIG. 2, if the user 108 is not satisfied with the initial segmentation at 302, the refinement module 112 may use the interactive tool (i.e., an interactive brush) 114 to allow the user 108 to refine the initial segmentation. The user 108 may use the interactive tool 114 to draw strokes on any perceived error regions to perform refinement. For example, the user 108 may use the interactive tool 114 to draw the interactive refinement stroke 400 to perform refinement. The stroke 400 may be drawn in the background area 308 (i.e., the hair region) as shown, or in the foreground area 306.

Based, for example, on strokes performed on the segmented digital image 110 (i.e., the digital image 300 including the initial segmentation at 302), the inference module 116 is to infer intentions of the user 108. Thus, based on the interactive refinement stroke 400, the inference module 116 infers intentions of the user 108. The inference module 116 may infer intentions of the user 108 by modeling a stroke (S) drawn by the user 108 into a set of pixels as follows:

$$S=\{p_1, p_2, \ldots, p_n\} \quad \text{Equation (1)}$$

The stroke (S) thus includes the pixels $p_1, p_2, \ldots, p_n$. Based on the initial segmentation at 302, $p_i$, where $1 \leq i \leq n$, belongs to either the foreground object 304 in the foreground area 306 (i.e., $p_i \in F$, where F is the foreground area 306) or the background area 308 (i.e., $p_i \in B$, where B is the background area 308). The user 108 may have a first intention (I1) to remove pixels from the foreground as they are background pixels but mistakenly classified as foreground. For the example of FIG. 3, I1 corresponds to the user's intention to remove background pixels in the foreground area 306 of the initial segmentation at 302 that the user perceives as being mistakenly classified as foreground. The user 108 may have a second intention (I2) to add pixels into the foreground as they are pixels on the object but are mistakenly segmented as background in the initial segmentation. For the example of FIG. 3, I2 corresponds to the user's intention to add background pixels into the foreground area 306 that the user 108 perceives as pixels on the object 304 and further perceives as being mistakenly classified as background.

The inference module 116 is to infer intentions of the user 108, for example, by using the Bayesian rule:

$$P(I|S) \propto P(S|I)P(I) \qquad \text{Equation (2)}$$

For Equation (2), P(I|S) represents the probability that stroke S corresponds to intention I, and P(S|I) represents the likelihood of assigning intention I to stroke S. P(I) represents the prior probability about the intention I based on the user behavior preferences. More specifically:

$$P(S \mid I = F) = \frac{\sum_j p_j \in F}{n} \text{ and } P(S \mid I = B) = \frac{\sum_j p_j \in B}{n} \qquad \text{Equation (3)}$$

Thus, based on Equation (3), P(I) represents how likely a stroke (S) corresponds to a foreground or background stroke based on the user preferences.

Figure 5:
FIG. 5 illustrates segmentation after refinement for the automatic initial segmentation of FIG. 3 to account for the interactive refinement stroke using the object segmentation apparatus, according to an example of the present disclosure.

FIG. 5 illustrates a segmentation 500 after refinement for the automatic initial segmentation at 302 of FIG. 3 to account for the interactive refinement stroke 400 of FIG. 4. Since the interactive refinement stroke 400 is entirely in the background area 308, the inference module 116 infers that the intention of the user 108 is to add pixels into the foreground area 306 as they are pixels on the object 304 but are mistakenly classified as background in the initial segmentation at 302 (i.e., second intention (I2)). However, if the interactive refinement stroke 400 is entirely in the foreground area 306, the inference module 116 infers that the intention of the user 108 is to remove pixels as they are background but mistakenly classified as foreground (i.e., first intention (I1)). The refinement module 112 may use properties such as the length, angular orientation, pixels covered by the interactive refinement stroke 400, etc., to generate the segmentation 500.

For example, suppose the stroke (S) includes 40 pixels (i.e., S={$p_1$, $p_2$, . . . , $p_{40}$}), and the pixels are all in the background area 308. Thus, per Equation (3):

$$p_{1,...40} \in B, P(S \mid I = F) =$$

$$\frac{\sum_j p_j \in F}{n} = 0/40 = 0 \text{ and } P(S \mid I = B) = \frac{\sum_j p_j \in B}{n} = 40/40 = 1.$$

Since P(S|I=B)>P(S|I=F), it can be inferred that the user intention is to correct the error caused by segmenting the foreground as background (i.e., second intention (I2)).

Figure 6:
FIG. 6 illustrates another interactive refinement stroke for the segmentation of FIG. 5 using the object segmentation apparatus, according to an example of the present disclosure.

If the user 108 draws an interactive refinement stroke that is partially in the foreground area 306 and the background area 308, the inference module 116 determines the user's intentions as follows. Specifically, FIG. 6 illustrates another interactive refinement stroke 600 for the segmentation of FIG. 5, with the interactive refinement stroke 600 being disposed partially in the foreground area 306 and partially in the background area 308. The inference module 116 determines the user's intentions by comparing a number of pixels in the interactive refinement stroke 600 in the foreground area 306 to a number of pixels in the background area 308. If the number of pixels in the interactive refinement stroke 600 that are in the foreground area 306 is greater than a number of pixels in the interactive refinement stroke 600 that are in the background area 308, then the inference module 116 determines the user's intentions correspond to the first intention (I1), that is, to remove pixels as they are background but mistakenly classified as foreground. If the number of pixels in the interactive refinement stroke 600 that are in the foreground area 306 is less than a number of pixels in the interactive refinement stroke 600 that are in the background area 308, then the inference module 116 determines the user's intentions correspond to the second intention (I2), that is, to add pixels into the foreground as they are pixels on the object but are mistakenly segmented as background in the initial segmentation. The confidence module 120 may also be used to confirm whether the intentions of the user 108 to correct the foreground or the background are accurate. If the number of pixels in the interactive refinement stroke 600 that are in the foreground area 306 is equal to a number of pixels in the interactive refinement stroke 600 that are in the background area 308, then the inference module 116 determines the user's intentions based, for example, on the determination made by the learning module 118 and/or the confidence module 120.

For example, referring to FIG. 6, suppose there are 30 pixels on the interactive refinement stroke 600 (i.e., S={$p_1$, $p_2$, . . . , $p_{30}$}), and 20 of the pixels are in the foreground area 306 and the remaining 10 pixels are in the background area 308, this equates to:

$$p_{1,...20} \in F, p_{21,...30} \in B, P(S \mid I = F) = \frac{\sum_j p_j \in F}{n} =$$

$$20/30 = 2/3 \text{ and } P(S \mid I = B) = \frac{\sum_j p_j \in B}{n} = 10/30 = 1/3.$$

Since P(S|I=F)>P(S|I=B), it can be inferred that the user intention is to correct the error caused by segmenting the background as foreground (i.e., first intention (I1)).

The confidence determination module 120 is to determine a confidence of the segmentation performed by the initial segmentation module 102 and the refinement module 112 along the segmentation. The confidence of the segmentation may be used, for example, to further facilitate inference of a user's intentions by the inference module 116. For example, referring to FIG. 6, if the number of pixels in the interactive refinement stroke 600 that are in the foreground area 306 is equal to, or approximately equal to, a number of pixels in the interactive refinement stroke 600 that are in the background area 308, then the inference module 116 determines the user's intentions based, for example, on the determination made by the learning module 118 and/or the confidence module 120. For example, if the segmentation confidence in the foreground area of the interactive refinement stroke 600 is high, then the user's intentions are inferred to correspond to the second intention (I2). Otherwise, if the segmentation confidence in the foreground area of the interactive refinement stroke 600 is low (i.e., segmentation is inaccurate), then the user's intentions are inferred to correspond to the first intention (I1). The determination to infer the user's intentions to correspond to the first or the second intentions (i.e., I1 or I2) may be dependent on factors such as the type of object being segmented, user preferences, etc., and thus may be different for different users 108.

Figure 7:
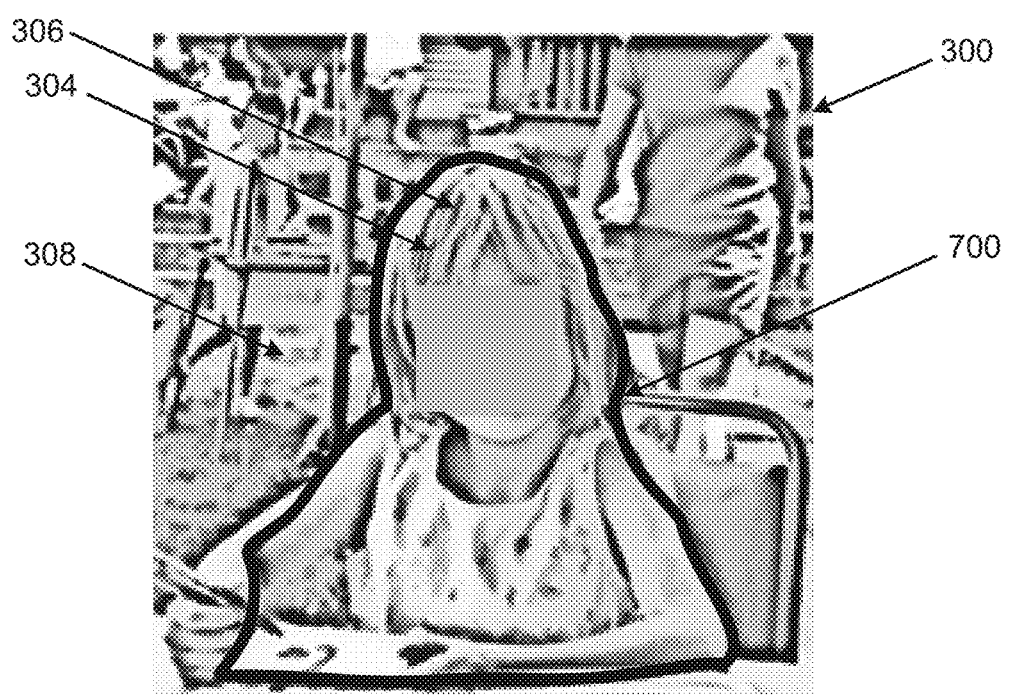
FIG. 7 illustrates segmentation after the refinement of FIG. 6 using the object segmentation apparatus, according to an example of the present disclosure.

FIG. 7 illustrates segmentation 700 after the refinement of FIG. 6 using the object segmentation apparatus 100, according to an example of the present disclosure. Referring to FIGS. 1, 6 and 7, it can be seen that since the interactive refinement stroke 600 is predominately in the foreground area 306, the intention of the user 108 is to correct the error caused by segmenting the background as foreground (i.e., first intention (I1)). Based on the user's inferred intention by the inference module 116, the segmentation 700 shows correction of the error caused by segmenting the background as foreground.

Figure 8:
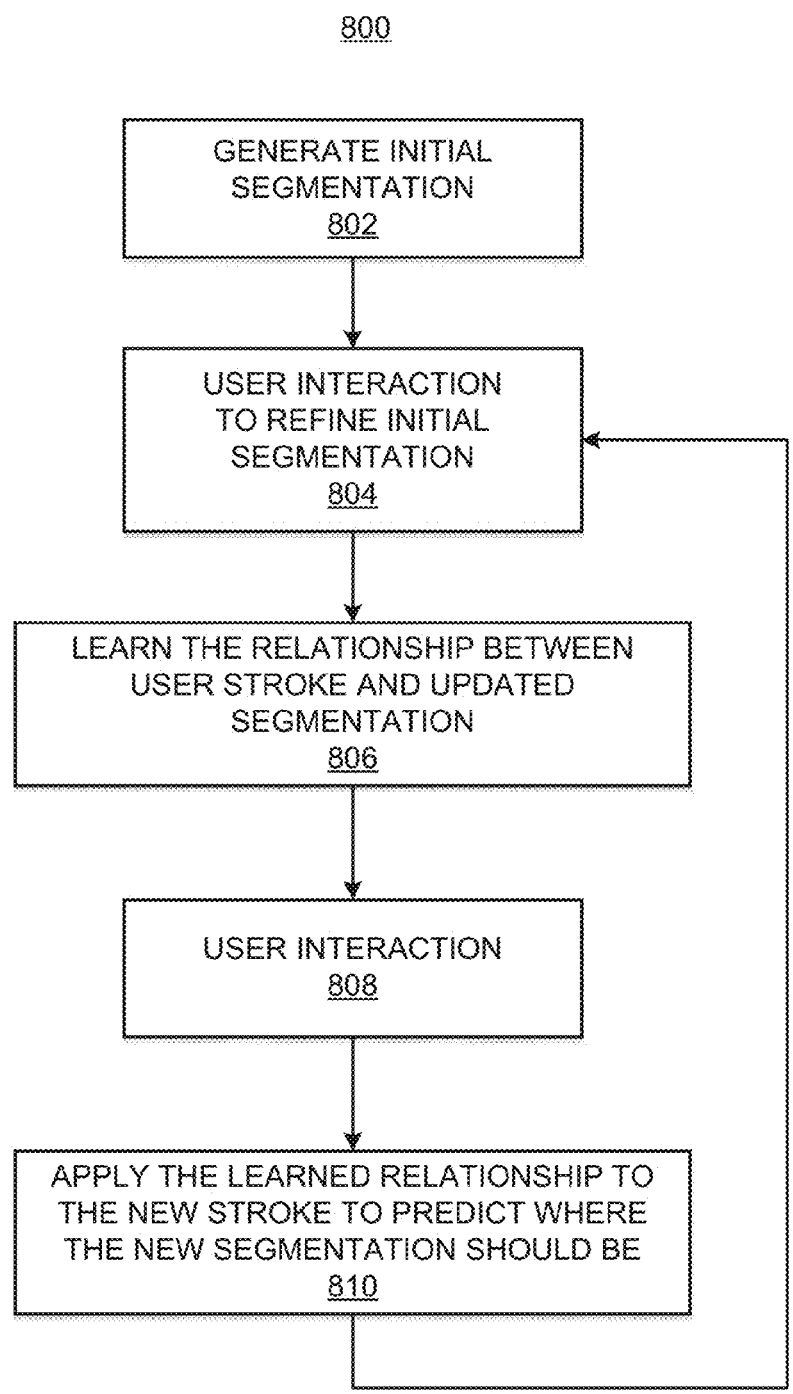
FIG. 8 illustrates a flowchart for learning user interactions using the object segmentation apparatus, according to an example of the present disclosure.

FIG. 8 illustrates a flowchart 800 for learning user interactions using the object segmentation apparatus 100, according to an example of the present disclosure. In order to learn user interactions, the learning module 118 interacts with the inference module 116 to facilitate inference of intentions of the user 108 based, for example, on the behavior of the user 108 to learn a relationship between refinement performed by the user 108 and the refined segmented digital image 110. For the flowchart 800, at 802, an initial segmentation of an image is generated by the initial segmentation module 102. At 804, the user 108 uses the interactive tool 114 to mark a stroke on the initially segmented image to refine the initial segmentation. At 806, once the inference module 116 infers intentions of the user 108 and the refinement module 112 refines the initial segmentation based on the inferred user intentions, the learning module 118 learns the relationship between the stroke used by the user and the updated segmentation (i.e., refined initial segmentation). The learning module 118 also learns the relationship between the closeness (i.e., average distance) of the stroke from the updated segmentation in the vicinity of the stroke. Based on this relationship, the learning module 118 learns the mapping (i.e., the user drawing habit), and this mapping may be applied when a new interaction is applied. For example, at 808, the user 108 uses the interactive tool 114 to mark a further stroke on the refined segmentation. At 810, the learning module 118 applies the learned relationship between the previous stroke to predict where the new segmentation should be. For example, if the further stroke at 808 is closer to the refined segmentation (i.e., based on closeness of the stroke to the refined segmentation), then any further segmentation refinement is performed to a lesser extent than if the further stroke at 808 is farther away from the refined segmentation. The learning module 118 also accounts for other factors, such as the length, angular orientation, curvature of any further strokes for any further segmentation refinement.

The learning module 118 may also account for a user's tendency to complete foreground objects first or instead to complete background areas first. For example, a user A may tend to like to complete a foreground object first, thus the user A often uses foreground strokes at the beginning to make the object complete (i.e., first intention (I1)). However, a user B likes to remove those areas that are mistakenly segmented as background, thus the user B prefers to use background strokes first (i.e., second intention (I2)). The intentions of users (e.g., the user A and the user B) may be learned over time by the learning module 118, for example, to infer that a user intends to complete a foreground object first, or instead to remove those areas that are mistakenly segmented as background if there are any discrepancies in the type of interactive refinement stroke drawn by a user.

Figure 9:
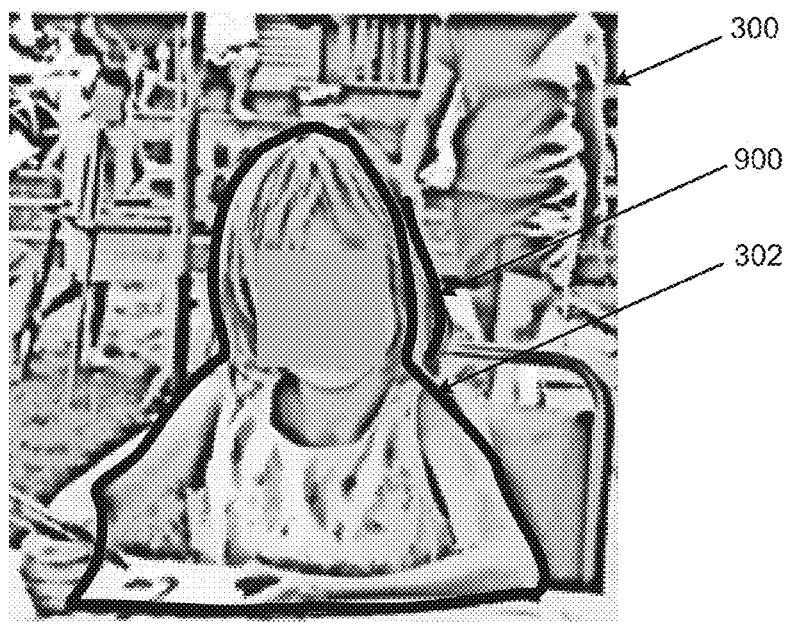
FIG. 9 illustrates an interactive refinement stroke by a first user for the automatic initial segmentation of FIG. 3 using the object segmentation apparatus, according to an example of the present disclosure.
Figure 10:
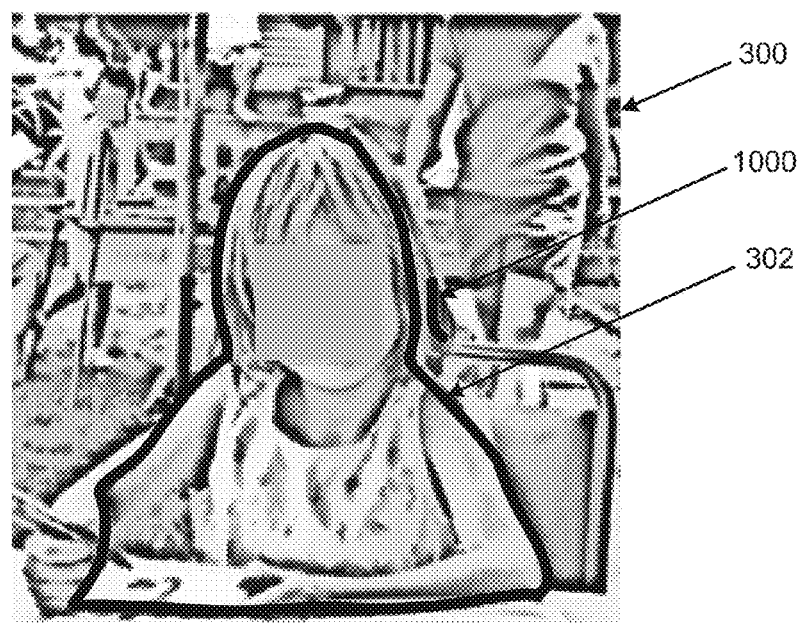
FIG. 10 illustrates an interactive refinement stroke by a second user for the automatic initial segmentation of FIG. 3 using the object segmentation apparatus, according to an example of the present disclosure.
Figure 11:
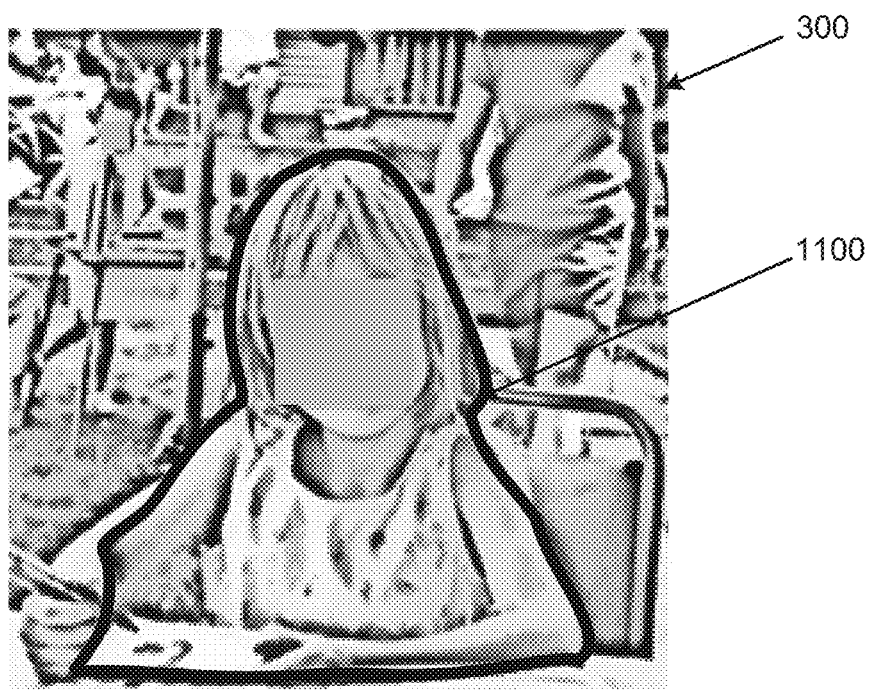
FIG. 11 illustrates segmentation after refinement for the automatic initial segmentation of FIG. 3 to account for the interactive refinement stroke by the first user of FIG. 9, using the object segmentation apparatus, according to an example of the present disclosure.

FIGS. 9-11 illustrate an example of operation of the learning module 118. For example, FIG. 9 illustrates an interactive refinement stroke 900 by a first user (i.e., user A) for the automatic initial segmentation at 302 of FIG. 3 using the object segmentation apparatus 100. Similarly, FIG. 10 illustrates an interactive refinement stroke 1000 by a second user (i.e., user B) for the automatic initial segmentation at 302 of FIG. 3 using the object segmentation apparatus 100. Referring to FIGS. 9 and 10, it can be seen that user A draws the interactive refinement stroke 900 closer to the actual segmentation boundary, while user B tends to draw the interactive refinement stroke 1000 in the middle of the perceived error area. Based on the interactive refinement strokes 900 and 1000, once the inference module 116 infers intentions of the users (i.e., user A and user B), and the refinement module 112 refines the initial segmentation based on the inferred user intentions, the learning module 118 learns the relationship between the strokes (i.e., the interactive refinement strokes 900 and 1000) used by the users and the updated segmentation. The learning module 118 also learns the relationship between the closeness (i.e., average distance) of the stroke from the updated segmentation in the vicinity of the strokes. Based on this relationship, the learning module 118 learns the mappings (i.e., the user drawing habits for user A and user B), and these mappings are applied when new interactions are applied. Assuming user A marks the image 300 with the interactive refinement stroke 900, FIG. 11 illustrates segmentation 1100 after refinement to account for the interactive refinement stroke 900. It can be seen that the segmentation 1100 accounts for the length of the interactive refinement stroke 900 for the user A.

The search and identification module 122 is to automatically search and identify objects in the digital image 104. For example, the search and identification module 122 may automatically identify objects in the digital image 104 by comparing the segmented objects in the segmented digital image 110 to a database of objects. For example, the search and identification module 122 may automatically identify objects in the digital image 104 by comparing the initial segmentation and/or the refined initial segmentation to objects in a database. Properties such as the shape, size, color, etc., of the segmented objects may be used to categorize and/or determine the specific type of object. Once the object is determined, aspects such as type, location, price, point of sale, etc., related to the object may be displayed on the user interface 106. The aspects related to the objects may be obtained from the information stored in the database, or from real-time search of the object or similar objects, for example, on the Internet. In this manner, the search and identification module 122 provides for automatic search and identification of objects in the digital image 104.

Figure 12:
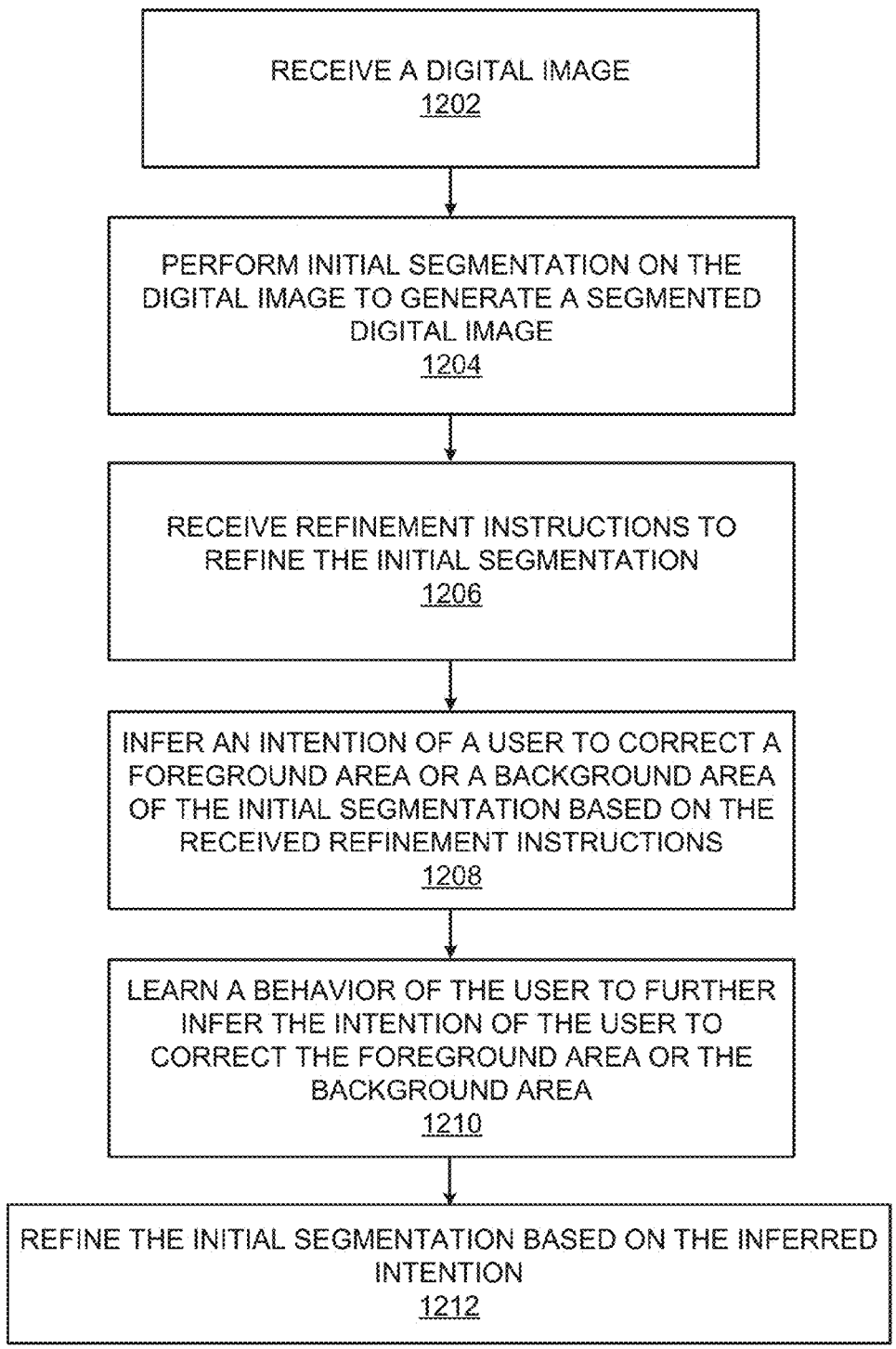
FIG. 12 illustrates a method for object segmentation, according to an example of the present disclosure.

FIG. 12 illustrates a flowchart of a method 1200 for object segmentation, corresponding to the example of the object segmentation apparatus 100 whose construction is described in detail above. The method 1200 may be implemented on the object segmentation apparatus 100 with reference to FIG. 1 by way of example and not limitation. The method 1200 may be practiced in other apparatus.

Referring to FIG. 12, for the method 1200, at block 1202, a digital image is received. For example, referring to FIG. 1, the digital image 104 may be received at the user interface 106 on a device, such as a mobile device, a tablet, or PC.

At block 1204, initial segmentation is performed on the digital image to generate a segmented digital image. For example, referring to FIG. 1, the initial segmentation module 102 is to perform initial segmentation on the digital image 104.

At block 1206, refinement instructions are received to refine the initial segmentation. For example, referring to FIG. 1, if the user 108 wishes to modify the initial segmentation performed by the initial segmentation module 102, the refinement module 112 may use an interactive tool (i.e., an interactive brush) 114 to allow the user 108 to refine the initial segmentation.

At block 1208, an intention of a user is inferred to correct a foreground area or a background area of the initial segmentation based on the received refinement instructions. For example, referring to FIG. 1, based, for example, on strokes performed on the segmented digital image 110, the inference module 116 is to infer intentions of the user 108. For example, the inference module 116 is to infer whether to remove background pixels in the segmented digital image 110 that the user perceives as being mistakenly classified as foreground, or to add background pixels into the foreground that the user perceives as pixels on an object in the foreground and further perceives as being mistakenly classified as background.

At block 1210, a behavior of the user is learned to further infer the intention of the user to correct the foreground area or the background area. For example, referring to FIG. 1, the learning module 118 is to interact with the inference module 116 to facilitate inference of intentions of the user 108 based, for example, on the behavior of the user 108 to learn a relationship between refinement performed by the user 108 and the refined segmented digital image 110.

At block 1212, the initial segmentation is refined based on the inferred intention. For example, referring to FIG. 1, based on the inference determined by the inference module 116, the refinement module 112 is to refine the initial segmentation performed by the initial segmentation module 102 and generate a refined version of the segmented digital image 110.

Figure 13:
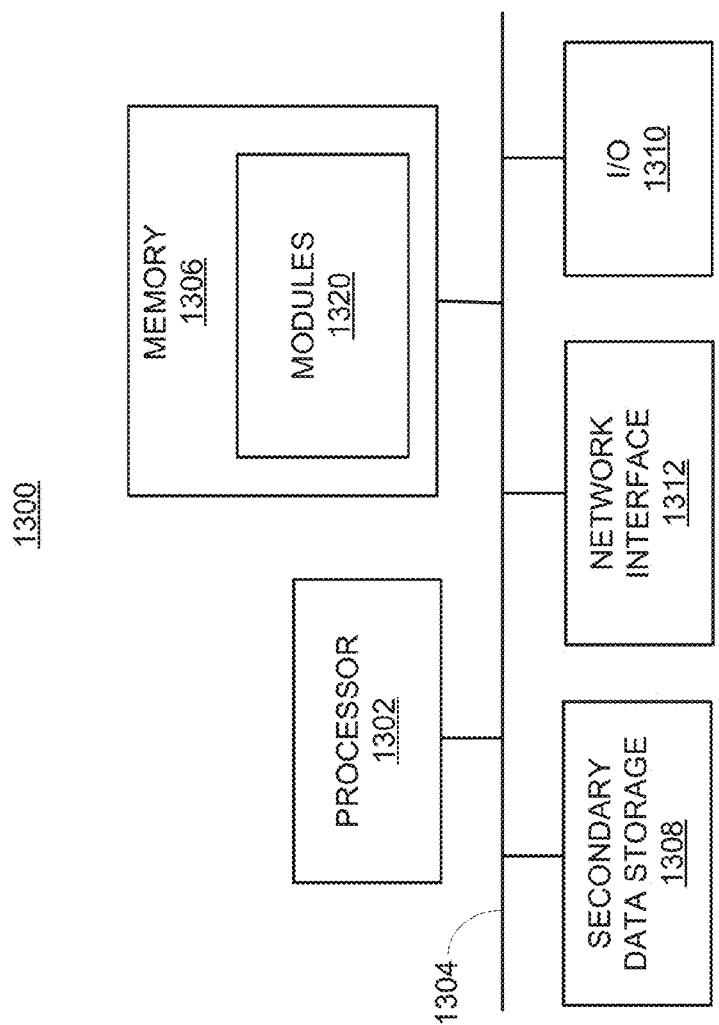
FIG. 13 illustrates a computer system, according to an example of the present disclosure.

FIG. 13 shows a computer system 1300 that may be used with the examples described herein. The computer system represents a generic platform that includes components that may be in a server or another computer system. The computer system may be used as a platform for the apparatus 100. The computer system may execute, by a processor or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system includes a processor 1302 that may implement or execute machine readable instructions performing some or all of the methods, functions and other processes described herein. Commands and data from the processor 1302 are communicated over a communication bus 1304. The computer system also includes a main memory 1306, such as a random access memory (RAM), where the machine readable instructions and data for the processor 1302 may reside during runtime, and a secondary data storage 1308, which may be non-volatile and stores machine readable instructions and data. The memory and data storage are examples of computer readable mediums. The memory 1306 may include modules 1320 including machine readable instructions residing in the memory 1306 during runtime and executed by the processor 1302. The modules 1320 may include the modules 102, 112, 116, 118, 120 and 122 of the apparatus shown in FIG. 1.

The computer system may include an I/O device 1310, such as a keyboard, a mouse, a display, etc. The computer system may include a network interface 1312 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for object segmentation, the method comprising:
   receiving a digital image;
   performing, by a processor, initial segmentation on the digital image to generate a segmented digital image having an outline that separates a foreground area from a background area;
   receiving a refinement stroke in the initial segmentation to refine the initial segmentation;
   determining, by the processor, an intention of a user to correct the foreground area or the background area of the initial segmentation based on the received refinement stroke, including:
      determining whether a number of pixels of the refinement stroke that are in the foreground area is greater than a number of pixels of the refinement stroke that are in the background area,
      in response to a determination that the number of pixels of the refinement stroke that are in the foreground area is greater than the number of pixels of the refinement stroke that are in the background area, determining that the intention of the user is to add pixels that are classified as foreground into the background area, and
      in response to a determination that the number of pixels in the refinement stroke that are in the foreground area is less than the number of pixels in the refinement stroke that are in the background area, determining that the intention of the user is to add pixels that are classified as background into the foreground area; and
   refining, by the processor, the initial segmentation based on the determined intention.

2. The method of claim 1, further comprising:
   performing the initial segmentation on the digital image based on semantic information with respect to content of the digital image.

3. The method of claim 1, wherein refining the initial segmentation comprises:
   removing pixels adjacent the refinement stroke that are classified as foreground pixels from the foreground area.

4. The method of claim 1, wherein refining the initial segmentation comprises:
   adding pixels adjacent the refinement stroke that are classified as background pixels into the foreground area.

5. The method of claim 1, wherein determining the intention of the user to correct the foreground area or the background area further comprises:
   determining whether a number of pixels of the refinement stroke are predominately in the foreground area or in the background area.

6. The method of claim 1, wherein determining the intention of the user to correct the foreground area or the background area further comprises:
  determining a probability that pixels of the refinement stroke are in the foreground area or in the background area.

7. The method of claim 1, wherein determining the intention of the user to correct the foreground area or the background area further comprises:
  determining a confidence of the initial segmentation adjacent the refinement stroke.

8. The method of claim 1, further comprising:
  determining a distance of the refinement stroke from a boundary of the initial segmentation.

9. The method of claim 1, further comprising:
  learning a behavior of the user, including determining whether the user prefers to correct the foreground area or the background area first.

10. The method of claim 1, further comprising:
  identifying a type of object in the digital image by comparing at least one of the initial segmentation and the refined initial segmentation to objects in a database.

11. An object segmentation apparatus comprising:
  a processor; and
  a memory storing machine readable instructions executable to cause the processor to:
    receive a digital image;
    perform initial segmentation on the digital image to generate a segmented digital image having an outline that separates a foreground area from a background area;
    receive a refinement stroke in the initial segmentation to refine the initial segmentation;
    determine an intention of a user to correct the foreground area or the background area of the initial segmentation based on the received refinement stroke, wherein to infer the intention of the user, the processor is to:
      determine whether a number of pixels of the refinement stroke that are in the foreground area is greater than a number of pixels of the refinement stroke that are in the background area,
      in response to a determination that the number of pixels of the refinement stroke that are in the foreground area is greater than the number of pixels of the refinement stroke that are in the background area, determine that the intention of the user is to add pixels that are classified as foreground into the background area, and
      in response to a determination that the number of pixels in the refinement stroke that are in the foreground area is less than the number of pixels in the refinement stroke that are in the background area, determine that the intention of the user is to add pixels that are classified as background into the foreground area; and
    refine the initial segmentation based on the determined intention.

12. The object segmentation apparatus of claim 11, wherein, to refine the initial segmentation, the machine readable instructions cause the processor to:
  remove pixels adjacent the refinement stroke from the foreground area that are classified as foreground pixels.

13. The object segmentation apparatus of claim 11, wherein, to refine the initial segmentation, the machine readable instructions cause the processor to:
  add pixels adjacent the refinement stroke into the foreground area that are classified as background pixels.

14. The object segmentation apparatus of claim 11, wherein, to determine the intention of the user, the machine readable instructions further cause the processor to:
  determine whether a number of pixels of the refinement stroke are predominately in the foreground area or in the background area.

15. A non-transitory computer readable medium having stored thereon machine readable instructions for object segmentation, the machine readable instructions when executed cause a processor of a computer system to:
  receive a digital image;
  perform initial segmentation on the digital image to generate a segmented digital image having an outline that separates a foreground area from a background area;
  receive refinement stroke in the initial segmentation;
  determine an intention of a user to correct the foreground area or the background area of the initial segmentation based on the received refinement stroke, wherein to infer the intention of the user, the instructions are to cause the processor to:
    determine whether a number of pixels of the refinement stroke that are in the foreground area is greater than a number of pixels of the refinement stroke that are in the background area,
    in response to a determination that the number of pixels of the refinement stroke that are in the foreground area is greater than the number of pixels of the refinement stroke that are in the background area, determine that the intention of the user is to add pixels that are classified as foreground into the background area, and
    in response to a determination that the number of pixels in the refinement stroke that are in the foreground area is less than the number of pixels in the refinement stroke that are in the background area, determine that the intention of the user is to add pixels that are classified as background into the foreground area; and
  refine the initial segmentation based on the determined intention.

* * * * *